(12) United States Patent  
Zhao et al.

(10) Patent No.: US 9,529,994 B2  
(45) Date of Patent: Dec. 27, 2016

(54) CALL STACK INTEGRITY CHECK ON CLIENT/SERVER SYSTEMS

(71) Applicant: SHAPE SECURITY, INC., Mountain View, CA (US)

(72) Inventors: Yao Zhao, Fremont, CA (US); Xinran Wang, San Ramond, CA (US)

(73) Assignee: Shape Security, Inc., Mountain View, CA (US)

( * ) Notice: Subject to any disclaimer, the term of this patent is extended or adjusted under 35 U.S.C. 154(b) by 103 days.

(21) Appl. No.: 14/552,331

(22) Filed: Nov. 24, 2014

(65) Prior Publication Data

US 2016/0147992 A1    May 26, 2016

(51) Int. Cl.
*G06F 21/50* (2013.01)
*H04L 29/06* (2006.01)
*G06F 21/62* (2013.01)

(52) U.S. Cl.
CPC .............. *G06F 21/50* (2013.01); *G06F 21/62* (2013.01); *H04L 67/42* (2013.01); *G06F 2221/033* (2013.01)

(58) Field of Classification Search
CPC .......... G06F 21/50; G06F 21/57; G06F 21/60; G06F 2221/033; H04L 67/42; H04L 29/06877; H04L 29/06884
USPC .......................................................... 726/22
See application file for complete search history.

(56) References Cited

U.S. PATENT DOCUMENTS

| | | |
|---|---|---|
| 6,606,663 B1 | 8/2003 | Liao |
| 6,938,170 B1 | 8/2005 | Kraft |
| 7,174,565 B2 | 2/2007 | Kadyk et al. |
| 7,480,385 B2 | 1/2009 | Weber |
| 7,707,223 B2 | 4/2010 | Zubenko et al. |
| 7,836,425 B2 | 11/2010 | Rubin et al. |

(Continued)

FOREIGN PATENT DOCUMENTS

WO    WO2013091709    6/2013

OTHER PUBLICATIONS

International Searching Authority, "Search Report" in application No. PCT/US15/52030, dated Dec. 22, 2015, 17 pages.

(Continued)

*Primary Examiner* — William Goodchild
(74) *Attorney, Agent, or Firm* — Hickman Palermo Becker Bingham LLP

(57) ABSTRACT

Computer systems and methods in various embodiments are configured for improving the security and efficiency of client computers interacting with server computers through supervising instructions defined in a web page and/or web browser. In an embodiment, a computer system comprising one or more processors, coupled to a remote client computer, and configured to send, to the remote client computer, one or more instructions, which when executed by the remote client computer, cause a run-time environment on the remote client computer to: intercept, within the run-time environment, a first call to execute a particular function defined in the run-time environment by a first caller function in the run-time environment; determine a first caller identifier, which corresponds to the first caller function identified in a run-time stack maintained by the run-time environment; determine whether the first caller function is authorized to call the particular function based on the first caller identifier.

22 Claims, 7 Drawing Sheets

(56) References Cited

U.S. PATENT DOCUMENTS

| | | | |
|---|---|---|---|
| 7,895,653 B2 | 2/2011 | Calo et al. | |
| 8,015,301 B2 | 9/2011 | Carter et al. | |
| 8,020,193 B2 | 9/2011 | Bhola et al. | |
| 8,132,242 B1 | 3/2012 | Wu | |
| 8,200,958 B2 | 6/2012 | Coppola et al. | |
| 8,266,202 B1 | 9/2012 | Colton et al. | |
| 8,473,620 B2 | 6/2013 | Demmer et al. | |
| 9,241,004 B1 | 1/2016 | April | |
| 2003/0217287 A1* | 11/2003 | Kruglenko | G06F 21/50 726/19 |
| 2004/0098447 A1 | 5/2004 | Verbeke et al. | |
| 2005/0108562 A1* | 5/2005 | Khazan | G06F 11/3604 726/23 |
| 2005/0114705 A1 | 5/2005 | Reshef et al. | |
| 2005/0182958 A1* | 8/2005 | Pham | G06F 21/51 726/22 |
| 2006/0155869 A1 | 7/2006 | Nanduri et al. | |
| 2006/0282897 A1* | 12/2006 | Sima | G06F 11/3664 726/25 |
| 2007/0186106 A1* | 8/2007 | Ting | H04L 63/104 713/168 |
| 2008/0222736 A1 | 9/2008 | Bodaei et al. | |
| 2009/0007243 A1 | 1/2009 | Boodaei et al. | |
| 2009/0119504 A1 | 5/2009 | Van et al. | |
| 2009/0144829 A1 | 6/2009 | Grigsby et al. | |
| 2009/0241174 A1 | 9/2009 | Rajan et al. | |
| 2009/0249310 A1 | 10/2009 | Meijer et al. | |
| 2010/0257354 A1 | 10/2010 | Johnston et al. | |
| 2010/0287132 A1 | 11/2010 | Hauser | |
| 2011/0107077 A1 | 5/2011 | Henderson et al. | |
| 2011/0296391 A1 | 12/2011 | Gass et al. | |
| 2011/0314091 A1 | 12/2011 | Podjarny | |
| 2012/0022942 A1* | 1/2012 | Holloway | H04L 63/1458 705/14.49 |
| 2012/0096116 A1 | 4/2012 | Mislove et al. | |
| 2012/0124372 A1 | 5/2012 | Dilley et al. | |
| 2012/0201133 A1 | 8/2012 | Raleigh | |
| 2012/0311715 A1 | 12/2012 | Tal et al. | |
| 2013/0061055 A1 | 3/2013 | Schibuk | |
| 2013/0091425 A1 | 4/2013 | Hughes et al. | |
| 2013/0173782 A1 | 7/2013 | Ragutski et al. | |
| 2013/0198607 A1* | 8/2013 | Mischook | G06F 17/30905 715/234 |
| 2013/0232234 A1 | 9/2013 | Kapur et al. | |
| 2014/0026185 A1 | 1/2014 | Dolby et al. | |
| 2014/0089786 A1 | 3/2014 | Hashmi | |
| 2014/0130182 A1 | 5/2014 | Yackanich | |
| 2014/0189499 A1 | 7/2014 | Gigliotti et al. | |
| 2014/0189808 A1 | 7/2014 | Mahaffey | |
| 2014/0222963 A1 | 8/2014 | Gangadhard et al. | |
| 2014/0250514 A1 | 9/2014 | Blomquist et al. | |
| 2015/0134956 A1 | 5/2015 | Stachura | |
| 2015/0271188 A1 | 9/2015 | Call | |
| 2015/0350181 A1 | 12/2015 | Call et al. | |
| 2016/0050231 A1 | 2/2016 | Varadarajan et al. | |
| 2016/0094575 A1 | 3/2016 | Shekyan | |
| 2016/0147992 A1 | 5/2016 | Zhao et al. | |

OTHER PUBLICATIONS

International Searching Authority, "Search Report" in application No. PCT/US15/62206, dated Apr. 7, 2016, 8 pages.

International Searching Authority, "Search Report" in application No. PCT/2016/018081, dated Apr. 25, 2016, 13 pages.

Current Claims in application No. PCT/US 15/62206, dated Apr. 2016, 5 pages.

Claims in application No. PCT/US2016/018081, dated Apr. 2016, 6 pages.

U.S. Appl. No. 14/290,805, filed May 29, 2014, Notice of Allowance, Mailing Date Aug. 24, 2015.

International Searching Authority, "Search Report" in application No. PCT/US15/32060, dated Aug. 25, 2015, 10 pages.

\* cited by examiner

CALL STACK INTEGRITY CHECK ON CLIENT/SERVER SYSTEMS

FIELD OF THE DISCLOSURE

The present disclosure generally relates to security techniques applicable to client/server systems, and relates more specifically to techniques for improving the security of client computers executing instructions received from server computers. SUGGESTED GROUP ART UNIT: 2441 or 2447; SUGGESTED CLASSIFICATION: 709/217.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user, such as a mouse click indicating that the user selected an object defined in the instructions, such as a link, a browser may send a request based on the selected object to the web server. The request may be a request for data and/or include data to be processed by the web server.

Attackers may use software, often referred to as a "bot" or "headless browser", which imitates a browser by receiving instructions from a web server and generating requests based on those instructions. For example, a bot may receive a web page, gather data in one or more objects defined in the web page, and generate a request for another web page to gather additional data, as if a user using a browser was requesting a new web page. Also for example, a bot may submit false or bogus data to a web server.

Attackers may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, brute force attacks, click fraud, DDoS attacks, bidding wars, and stack fingerprinting attacks. As a specific example, a malicious user may cause a bot to traverse through pages of a web site and collect private and/or proprietary data, such as who is connected with whom on a particular social networking web site.

Furthermore, attackers may inject malicious instructions into a web page and/or a browser. The malicious instructions may be configured to simulate a user interacting with the web page and/or browser. For example, malicious instructions injected into a web page, which when executed by a browser, may call one or more functions defined by the web page and/or the browser to gather data in the web page, collect and/or ask for user input, submit data to a web server, and/or request additional data from a server. The injected malicious instructions may further use functions defined in the web page and/or browser to send collected data to an attacker's online storage server or to pose as a legitimate browser. A legitimate browser may be a browser operated by a legitimate user.

Web server administrators may wish to prevent attacks from malicious users, while allowing legitimate users to use the site as intended. However, it is difficult to determine whether a legitimate user is using a web browser or whether the browser is infected, and/or operated, by a malicious user.

SUMMARY

The appended claims may serve as a summary of the invention.

Figure 3:
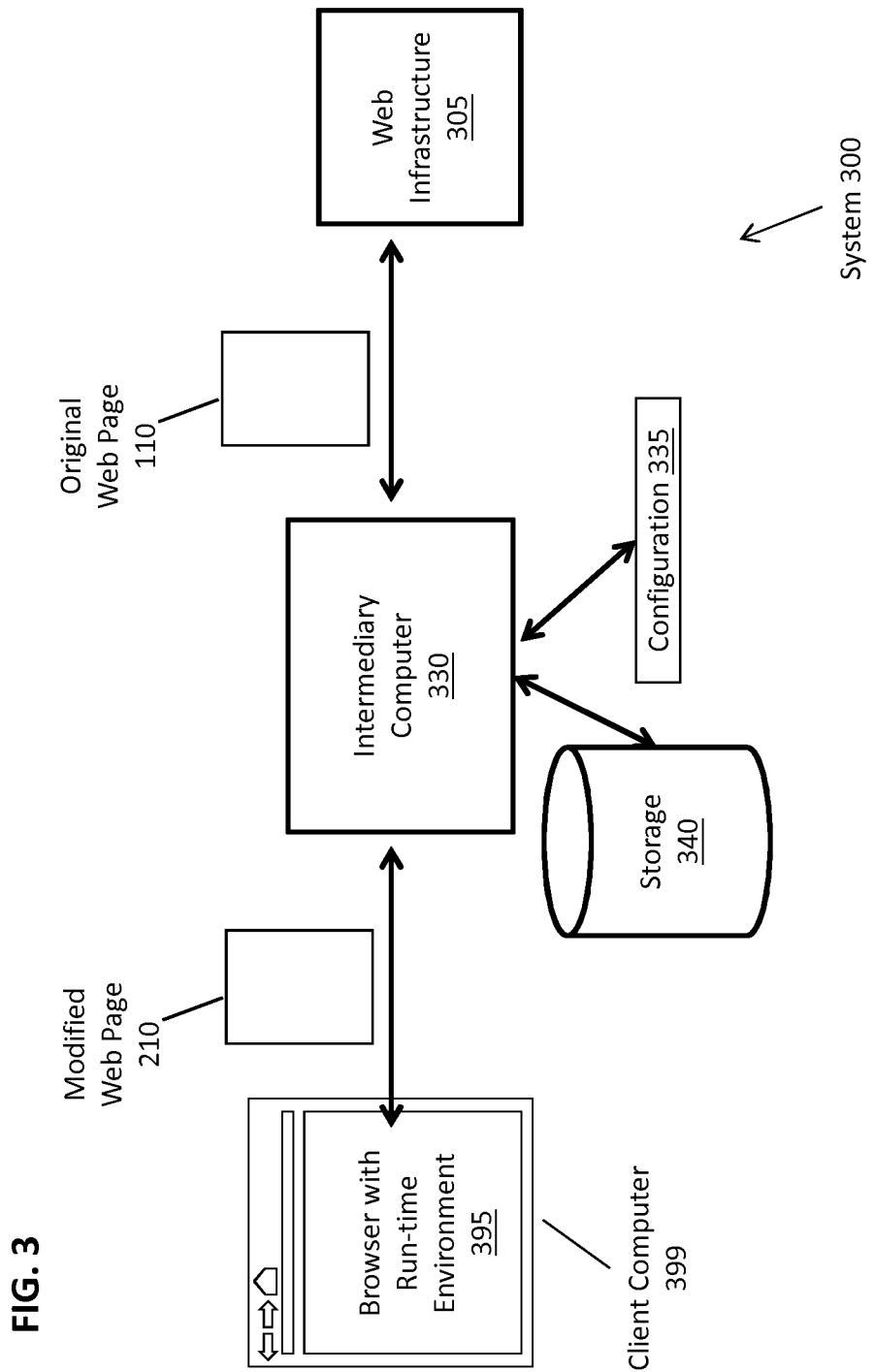
FIG. 3 illustrates a computer system comprising a browser, a web infrastructure, and an intermediary computer, which may be configured to protect functions and/or data structures defined, referenced, or called from instructions sent from the web infrastructure to the client computer, in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 330 in FIG. 3 may be described with reference to several components illustrated in FIG. 5 and discussed in detail below, but using the particular arrangement illustrated in FIG. 3 is not required in other embodiments. Furthermore, while the instructions discussed in many example embodiments are HyperText Markup Language ("HTML") and JavaScript instructions, in other embodiments, the instructions intercepted and generated may be any other standard and/or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Browsers, Bots, and Injected Malware
   2.1 Less Sophisticated Bots
   2.2 More Sophisticated Bots
   2.3 Injected Malware
3.0 Protecting Functions from Bots and Malware
   3.1 Direct Callers and Indirect Callers
   3.2 Supervisor Functions
      3.2.1 Caller Function Identifiers
      3.2.2 Validating a Call Stack
      3.2.3 Blacklisting Caller Functions
4.0 Example Network Topology for dynamically Protecting Functions Executed on a Client Computer
   4.1 Web Infrastructure
   4.2 Intermediary Computer
      4.2.1 Protocol Client Logic
      4.2.2 Processing Logic
      4.2.3 Injection logic
      4.2.4 Protocol Server Logic
      4.2.5 Configurations
      4.2.6 Storage
   4.3 Browser
5.0 Process Overview
   5.1 Intercepting Instructions from a Server Computer
   5.2 Injecting Supervisor Instructions into a Web Page
      5.2.1 Determining which Functions should be Protected
      5.2.2 Determining one or more Authorized Call Stacks
      5.2.3 Generating Authorized Caller Function Identifiers
      5.2.4 Generating and Injecting Supervisor Instructions into a Web Page
   5.3 Sending the Modified Web Page to the Client Computer
6.0 Implementation Mechanisms—Hardware Overview
7.0 Other Aspects of Disclosure

1.0 GENERAL OVERVIEW

In an embodiment, a specialized computing system comprising one or more processors, coupled to a remote client computer, and configured to send, to the remote client computer, one or more instructions, which when executed by the remote client computer, cause a run-time environment on the remote client computer to: intercept, within the run-time environment, a first call to execute a particular function defined in the run-time environment by a first caller function in the run-time environment; determine a first caller identifier, which corresponds to the first caller function identified in a run-time stack maintained by the run-time environment; determine whether the first caller function is authorized to call the particular function based on the first caller identifier.

The specialized computing system, wherein the one or more instructions, which when executed by the remote client computer, are further configured to cause the run-time environment to terminate the first call without performing the particular function in response to determining that the first caller function is not authorized to call the particular function.

The specialized computing system, wherein the one or more instructions, which when executed by the remote client computer, are further configured to cause the run-time environment to execute the particular function based, at least in part, on determining that the first caller function is authorized to call the particular function.

The specialized computing system, wherein the one or more instructions, which when executed by the remote client computer, are further configured to cause the run-time environment to execute the particular function based, at least in part, on determining that the first caller function is authorized to call the particular function.

The specialized computing system, wherein: the one or more instructions include a first dynamic identifier; the one or more instructions are further configured to cause the run-time environment to, as part of determining the first caller identifier: determine a first caller name that corresponds to the first caller function from the run-time stack; perform a hashing function on the first caller name to produce the first caller identifier; determine whether the first caller function is authorized to call the particular function based on the first caller identifier is based on whether the first caller identifier matches the first dynamic identifier.

In an embodiment, a data processing system comprising: a memory; one or more processors coupled to the memory; a protocol logic stored in the memory, executed by the one or more processors, and configured to cause the one or more processors to receive, from a web server computer, a first set of instructions that define one or more original operations; an injection logic stored in the memory, executed by the one or more processors, and configured to cause the one or more processors to add one or more supervisor instructions to the first set of instructions to produce a modified set of instructions prior to providing the modified set of instructions to a client computer; a server logic stored in the memory, executed by the one or more processors, and causing the one or more processors to send the modified set of instructions to a remote client computer; wherein the one or more supervisor instructions are configured to cause a run-time environment executed on the client computer to intercept a first call to execute a particular function from a first caller function, determine whether the first caller function is authorized to call the particular function.

Embodiments discussed herein provide numerous benefits and improvements over the general idea of increasing the resistance of browsers and server computers to computer attacks. For example, one or more of the embodiments discussed herein may prohibit the ability of injected, malicious instructions to call one or more functions defined in a web page, a run-time environment and/or a browser-based application. One or more of the embodiments discussed herein may allow authorized functions to call one or more protected functions, while prohibiting malicious instructions from calling the same functions.

2.0 BROWSERS, BOTS, AND INJECTED MALWARE

A web browser may be a computer program through which server-based application programs can provide client computers with content in a dynamic, custom UI. For example, in response to receiving a request for data from a web browser, a computer configured as a web server may respond with a set of instructions that define one or more objects with one or more object identifiers. The browser, and/or the instructions from a web server, may define functions to perform one or more of the following: define how objects may be presented in a user interface ("UI") to enable human/computer interaction, retrieve data from, and/ or store data in, a client computer or a server computer on behalf of a user, and/or any other operation on a client computer and/or in concert with a server computer. For convenience of expression, a set of instructions may be referred to herein as a file and/or web page. However, a set of instructions, file, and/or web page may comprise one or more files and/or data packets. A set of instructions, file(s), and/or web page(s) need not have a particular type or extension, and need not be stored in persistent storage. For example, a web page may be generated dynamically on a server computer and/or a client computer based on one or more parameters. While some files may be identified as a particular type of file, such as an "HTML file" or "JavaScript file", a file may include mixed content. For example, an HTML file may include HTML, JavaScript, Cascading Style Sheets ("CSS") instructions, and/or any other standard and/ or proprietary set of instructions.

In contrast to legitimate browsers, bots are computer programs that traverse web pages and/or web sites to retrieve data from, and/or submit data to, one or more web servers with little, if any, human/computer interaction. For example, in response to receiving a request for data from a bot, a web server may respond with a set of instructions. A bot may parse the instructions to collect data from, and/or to store data in, particular objects with particular object identifiers. A bot may also make requests based on an object identifier, such as the identifier for a text field input. Unlike a legitimate browser used by a legitimate user, a bot need not execute the instructions that define how objects should be presented in a UI because the bot is built to operate with little, if any, human/computer interaction. Thus, a bot may be a functionally-limited and/or automated browser.

2.1 Less Sophisticated Bots

Less sophisticated bots need not include parsers and/or execution environments. For example, a bot may be configured to search for data embedded in a document object model ("DOM") defined in one or more HyperText Markup Language ("HTML") documents. Therefore, the bot may include an HTML parser. However, the bot need not include other parsers or execution environments, such as an image parser, CSS parser, JavaScript parser, extension execution environment, and/or JavaScript execution environment.

Data and functionality in a web page may be protected from less sophisticated bots by embedding data and functionality into code that will not be executed by less sophisticated bots. For example, a web page may include HTML and JavaScript instructions. The HTML instructions may define an object that is presented in a UI, but need not initially include any personal data. The JavaScript instructions may define a function, which when executed populates the object with personal data for a particular user, which is then presented in the UI. A less sophisticated bot may be prevented from gathering the personal data that would have been included in the object because the less sophisticated bot cannot, and/or does not, execute the JavaScript that puts the data in the object before attempting to retrieve the data from the object.

Web servers may be protected from less sophisticated bots by embedding functionality into code that will not be executed by a less sophisticated bot. For example, a web page comprising HTML instructions may define a link, which when selected by a user in a browser is configured to call a JavaScript function. The JavaScript function may be configured to gather data related to the link, and/or other objects defined in the web page, perform one or more operations on the data, and submit a request with the gathered and/or derived data to a web server. If the web server does not receive the correct data, then the web server may disregard the request and/or return an error. A less sophisticated bot may require a substantial amount of work to be configured to gather and/or derive the data required by the web server to validated a request and send a request with the data to the web server.

Figure 1:
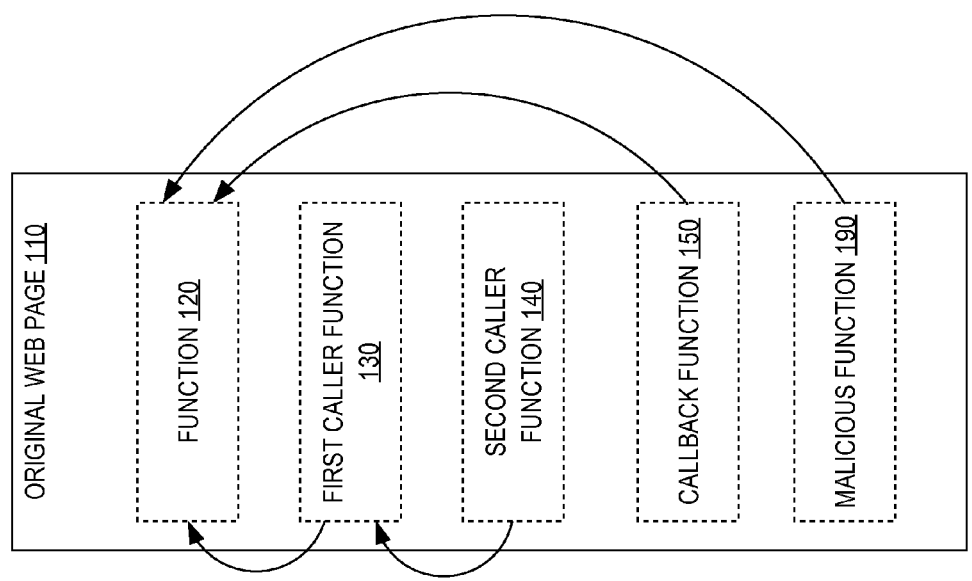
FIG. 1 illustrates an example structure of the text and code in a web page that defines one or more objects and one or more functions, including an unprotected function configured to implement one or more countermeasures to protect a user and/or a server computer, in an example embodiment.

FIG. 1 illustrates an example structure of the text and code in a web page that defines one or more objects and one or more functions, including an unprotected function configured to implement one or more countermeasures to protect a user and/or a server computer, in an example embodiment. In the example of FIG. 1, an original web page 110 comprises a function 120 that is referenced by a first caller function 130, a callback function 150, and a malicious function 190. A second caller function 140 is configured to call the first caller function 130. Each of the functions 120, 130, 140, 150, 160 may be implemented using any of several different document markup languages or computer program languages, such as HTML, JAVASCRIPT, and equivalents thereof. For purposes of illustrating a clear example, assume that the following Snippet 1, is an excerpt of markup instructions and/or code from original web page 110, and Snippet 2 is an excerpt from original web page 110 that defines function 120.

Snippet 1:

| line 1: | `<form id="Booth" action="vote.com/submitVote.php" method="post">` |
| line 2: | `<hidden id="ValidationToken" name="ValidationToken" value="false">` |
| line 3: | `<p>name: <input id="Candidate" name="Candidate"/></p>` |
| line 4: | `<input id = "Vote" name= "Vote" type="button" value="Vote" onclick="Function120( );">` |
| line 5: | `</form>` |

In Snippet 1, a form identified as "Booth" is defined, which has a hidden field named "ValidationToken", a text field named "Candidate", and a button named "Vote", which when selected by a legitimate user using a browser causes the browser to execute function 120, which is discussed below and is assigned the following alias: "Function120".

Snippet 2:

| line 1: | `var Function120 = function( ) {` |
| line 2: | `var validationToken = document.getElementById("ValidationToken");` |
| line 3: | `validationToken.value = "true";` |
| line 4: | `document.getElementById("Booth").submit( );` |
| line 5: | `}` |

In Snippet 2, line 1, function 120 is assigned the alias "Function120". When executed by a legitimate browser, function 120 may cause the browser to set the ValidationToken field to "true", and then submit a request, which includes the values stored in the Booth form object as parameters, to a web server.

When the web server receives the request, the web server may determine whether the ValidationToken parameter is set to "true". If the ValidationToken parameter is set to "true", then the web server may determine that the request was made by a legitimate browser and process the request. If the ValidationToken parameter is set to any value other than "true", or is not present in the request, then the web server may reject the request and/or perform one or more countermeasures.

A less sophisticated bot configured to repeatedly submit a large number of votes for a particular candidate may be thwarted because the bot cannot execute function 120, which causes a legitimate browser to send a valid vote to a web server. Over time, a malicious user may determine that the web server is performing a negative response to the invalid requests sent from the bot. In response, the malicious user may invest time in configuring the less sophisticated bot user may spoof a field named ValidationToken that is set to "true".

In the example above, a single hidden input field is used to determine whether a request is legitimate or not. However, in an embodiment, more complex countermeasures and/or anti-tampering systems may be used. For example, a polymorphic protocol may be implemented, which dictates that of the name of the hidden field changes each time the web page is rendered and/or sent to a browser. The polymorphic protocol may further dictate that the reference(s) to the hidden field should be updated throughout the web page so that the function 120 will continue to operate correctly.

2.2 More Sophisticated Bots

A more sophisticated bot may include one or more parsers and/or execution environments to subvert one or more countermeasures and/or anti-tampering systems, such as the countermeasures and/or anti-tampering systems discussed above. For example, a sophisticated bot may include a JavaScript engine, which can be used to generate a run-time environment that executes JavaScript instructions.

Data and functionality in a web page may be difficult to protect from more sophisticated bots. For example, to simulate a user interacting with one or more objects in a web page, the more sophisticated bot may programmatically call a JavaScript function, which, on a legitimate browser, may be automatically triggered by one or more user inputs. For purposes of illustrating a clear example, assume that Snippet 3 is an excerpt of malicious function 190 created by a malicious user and embedded in a bot to subvert the countermeasures in Snippet 1 and Snippet 2. In FIG. 1, malicious function 190 is injected into original web page 110; however, as discussed in this example, malicious function 190 may be included in, and/or part of, a more sophisticated bot.

Snippet 3:

```
line 1:    var MaliciousFunction190 = function( ) {
line 2:        var candidateInputField =
               document.getElementById("Candidate");
line 3:        candidateInputField.value = "Ted";
line 4:        Function120( );
line 5:    }
```

In line 1 of Snippet 3, malicious function 190 is assigned "MaliciousFunction190" as an alias. In line 2, the input field, element, or object identified "Candidate" is retrieved. In line 3, the value is set to the name of a particular candidate, "Ted". In line 4, MaliciousFunction190 expressly calls Function120, which updates the ValidationToken object to include a valid token and submits a request to the web server to vote for the candidate named Ted.

Web servers may be more susceptible to sophisticated bots. As seen in the previous example, a bot that includes malicious function190, which expressly calls function 120, allows the bot to generate a request with a valid token. Even if the valid token changes from "true" to "1", as an example, then the bot may still submit a valid request to the server computer by expressly calling function 120. The web server receiving the request generated by function 120 may incorrectly determine the request is from a legitimate browser and process the request accordingly. For example, the web server may update a database tracking the number of votes for each candidate.

2.3 Injected Malware

Attackers may use one or more techniques, such as cross site scripting, to inject malicious instructions into a web page, which when executed bypass a countermeasure and/or anti-tampering system. For example, if an attacker successfully injects the malicious function aliased as "MaliciousFunction190", in Snippet 3, and one or more instructions calling the malicious function, then a legitimate browser infected with malicious function may send one or more requests to a web server that appear to be valid votes from an infected legitimate browser.

3.0 PROTECTING FUNCTIONS FROM BOTS AND MALWARE

In an embodiment, a "supervisor" function may be used to protect another function, referred to herein as a "protected" function, from bots and/or malicious instructions. A supervisor function may be a function that determines, at run-time, whether the function(s) that call a protected function are pre-authorized to call the protected function. If so, the supervisor function may call the protected function, and/or cause the protected function to be executed. Otherwise, the supervisor function may terminate, return an invalid response or error flag, raise an exception and/or other error, display an error, and/or perform any other negative response that interrupts and/or prevents execution of the protected function.

In an embodiment, in response to determining that a protected function was called by an unauthorized function, the supervisor function may send data to a server computer indicating that the browser and/or client computer is a bot and/or infected with malware. In response, the server computer may perform one or more negative responses, such as block or disregard one or more future requests sent from the browser and/or client computer. Additionally or alternatively, the server computer may include one or more additional countermeasures in subsequent responses. For example, the server computer may send the client computer new instructions in a subsequently requested web page, which when executed in a legitimate browser require a user to enter a keyword or password.

3.1 Direct Callers and Indirect Callers

For convenience of expression, in this description a function that is called by another function is referred to as a "callee" or "callee function"; and, a function that calls another function is referred to as a "caller" or "caller function". A caller function "directly" calls a particular callee function if it expressly calls the callee function. A caller function "indirectly" calls a particular callee function if the caller function does not expressly call the callee function, but causes the callee function to be called. For purposes of illustrating a clear example, assume Snippet 4 is an excerpt of first caller function 130, and Snippet 5 is an excerpt of second caller function 140.

Snippet 4:

```
line 1:     var FirstCallerFunction130 = function( ) {
line 2:         Function120( );
line 3:     }
```

In snippet 4, in line 2, first caller function 130, aliased as "FirstCallerFunction130", expressly calls function 120. Thus, first caller function 130 directly calls, or is a "direct caller" of, function 120.

Snippet 5:

```
line 1:     var SecondCallerFunction140 = function( ) {
line 2:         FirstCallerFunction130( ) ;
line 3:     }
```

In snippet 5, in line 2, second caller function 140, aliased as SecondCallerFunction140, expressly calls first caller function 130, which in turn calls function 120. Thus, second caller function 140 indirectly calls, or is an "indirect caller" of function 120. In this example, the indirect caller function directly calls the direct caller function; however, any caller function that causes a particular callee function to be called through one or more other caller functions may be an indirect caller function.

3.2 Supervisor Functions

Figure 2:
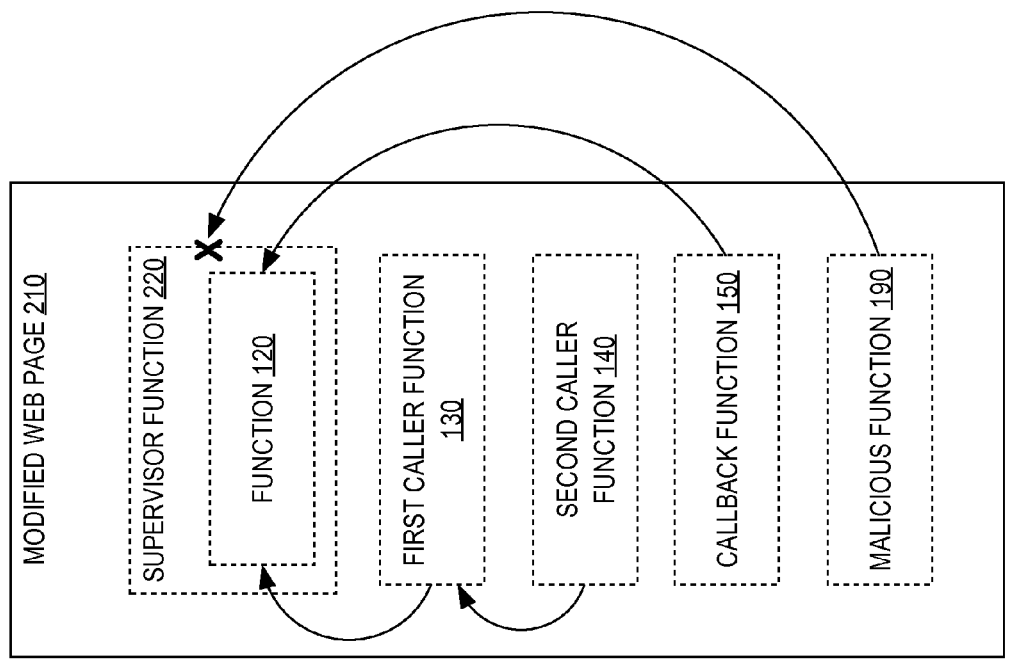
FIG. 2 illustrates a modified web page that defines a supervisor function, which may intercept calls to the protected function and prevent unauthorized callers from calling the protected function, in an example embodiment.

A supervisor function may be used to protect a function defined in a web page and/or browser. FIG. 2 illustrates a modified web page that defines a supervisor function, which may intercept calls to the protected function and prevent unauthorized callers from calling the protected function, in an example embodiment. In the example of FIG. 2, a modified web page 210 comprises a supervisor function 220 that refers to, contains, and/or encapsulates the function 120; the first caller function 130, second caller function 140, callback function 150, and malicious function 190 are present in the arrangement of FIG. 1 except that, as further described, the malicious function is unable to call or access the function 120 due to the configuration of supervisor function 220. For purposes of illustrating a clear example, assume Snippet 6 is an excerpt of modified web page 210, and defines supervisor function 220.

Snippet 6:

```
line 1:     var ProtectedFunction120 = Function120;
line 2:     var SupervisorFunction220 = function( ) {
line 3:         var AuthorizedCallerID = 130;
line 4:         var Caller = arguments.callee.caller;
line 5:         var CallerID = identifierHash(Caller);
line 6:         if(CallerID == AuthorizedCallerID) {
line 7:             ProtectedFunction120( );
line 8:         }
line 9:         else {
line 10:            throw "Not Allowed";
line 11:        }
line 12:    }
line 13:    Function120 = SupervisorFunction220;
```

In Snippet 6, line 1, the protected function, function 120, is assigned a new alias: "ProtectedFunction120". In line 2, supervisor function 220 is defined, and is given the following initial alias: "SupervisorFunction220". In line 3, an identifier for an authorized caller function is defined. The identifier may be a hash or code based on one or more factors discussed herein. The hash for each of the authorized caller functions may be pre-computed and/or pre-determined by a server computer and/or user as discussed herein. In lines 4-5, an identifier for the direct caller of the supervisor function is generated using a "client-side hashing" function (discussed in detail herein and aliased is Snippet 6 as "identifierHash"). In line 6, supervisor function 220 determines whether the identifier for the current direct caller matches, and/or is equivalent to, the authorized caller function identifier. If so, control passes to line 7, which calls the protected function is called using the new alias ("ProtectedFunction120"); otherwise, control passes to line 10. In line 10, the supervisor function raises or throws an exception error, which terminates supervisor function 220 without calling function 120 and indicates an unauthorized caller function attempted to call function 120. In line 13, supervisor function 220 is assigned the original alias of the protected function.

For purposes of illustrating how supervisor function 220 may work as discussed above, assume first caller function 130 expressly calls the protected function (function 120) using function 120's original alias ("Function120"), and the identifier for first caller function 130 is determined by the client-side hashing function to be the value 130. Supervisor function 220 may intercept the call to function 120. Supervisor function 220 may generate an identifier based on first caller function 130, which for this example is 120. Supervisor function 220 may compare the generated identifier with the authorized identifier. In response to determining that the generated identifier and the authorized identifier match, supervisor function 220 may call the protected function using the new alias ("ProtectedFunction120"). "Calling" the protected function may comprise, expressly calling a protected function by a new alias and/or performing one or more other operations that cause the protected function to be executed.

For purposes of illustrating a clear of example of how supervisor function 220 may perform as configured in Snippet 6 if called by an unauthorized caller function, assume that malicious function 190 (aliased as "MaliciousFunction190"), expressly calls the protected function (function 120) using the original alias, "Function120". In response, the browser may call supervisor function 220, instead of function 120. Supervisor function 220, using the client-side hashing function, may generate an identifier for the direct caller function (malicious function 190), which in this example may be the value 190. Supervisor function 220 may compare the generated identifier (190) with the authorized identifier (130). In response to determining that the generated identifier and the authorized identifier do not match, supervisor function 220 may throw an exception error, causing the process that attempted to call the protected function to terminate.

In the example discussed above, a new alias (ProtectedFunction120) is assigned to function 120, and the supervisor function (supervisor function 220) causes function 120 to be executed by calling function120 using the new alias. In an embodiment, one or more instructions in a protected function may be embedded in the supervisor function, the supervisor function need not call the protected function, and/or the protected function need not be assigned a new alias. For example, instead of calling function 120 in line 7 of Snippet 6 using the new alias, lines 2-4 in Snippet 2 may be embedded in the supervisor function 220 at line 7 in Snippet 6. The supervisor function may include brackets and/or other features to encapsulate the embedded instructions within a different scope. Additionally or alternatively, the protected function, and/or the one or more instructions from the protected function included in the supervisor function, may be removed, and/or need not be sent to, a client computer. Embedding one or more instructions from a protected function into a supervisor function, not including the one or more instructions outside of a supervisor function, and/or not including the protected function in a set of instructions sent to a client computer, may prevent attackers and/or bots from directly calling the protected function, and/or causing the one or more instructions previously in the protected function to be executed, using the new protected function alias to bypass the supervisor function.

3.2.1 Caller Function Identifiers

In Snippet 6, line 3, AuthorizedCallerID stores a function identifier for an authorized caller function, which is based on the authorized caller function (FirstCallerFunction130). A function identifier may, but need not, uniquely identify an authorized caller function. A function identifier may be based on one or more features of a caller function, such as the function name, length, body, declaration, definition, parameters, outputs, type signature, type annotation, function signature, and/or any other attributes of the function. Additionally or alternatively, a function identifier may be derived from one or more features of the function, such as the MD5 sum and/or SHA-1 hash of one or more features of a caller function. Additionally or alternatively, a function identifier may be based on one or more proprietary and/or standard operations based one or more features of a caller function. Additionally or alternatively, a function identifier may be a value that is associated with function in a lookup table and/or any other data structure. The one or more operations used to determine each authorized caller function's function identifier may be referred to herein as a server-side hashing function.

The "identifierHash" function (referred to herein as the client-side hashing function), in line 5 of Snippet 6, may generate a function identifier for the actual caller function using the same and/or equivalent one or more operations used to generate AuthorizedCallerID. Accordingly, if a function identifier, which is generated based on one or more features of the actual caller function, matches an authorized caller function identifier, then the supervisor function will proceed to call the protected function; otherwise, the supervisor function may perform one or more negative responses, such as terminating the supervisor function without calling the protected function, terminating one or more processes or threads, returning an error, raising or throwing an exception, and/or any other action that alerting a user, browser, client computer, web server, or web site administrator of an error and/or prevents the protected function from being executed.

3.2.2 Validating a Call Stack

A "call stack" or "call chain" may be data and/or a data structure that identifies one or more functions that were called leading up to a particular callee function being called and/or executed. In the example illustrated in Snippet 6, only the direct caller function was validated. However, in an embodiment, a supervisor function may comprise a set of authorized caller identifiers, and the supervisor function may iteratively or recursively traverse through the call stack to verify that each caller function is authorized to directly and/or indirectly call the protected function. Verifying that each function in the call stack is an authorized direct or indirect caller function may be referred to herein as validating a call stack. In response to determining that a call stack is valid, a supervisor function may call the protected function. Otherwise, the supervisor function may perform a negative response.

The set of authorized caller identifiers may be organized as an ordered list. In response to determining that one or more of the function identifiers derived from the call stack deviate in order, and/or in any other way, from the ordered list, then the supervisor function may perform a negative response; otherwise, the supervisor function may call the protected function. The set of authorized caller identifiers may be organized as a call graph, or tree. In response to determining that one or more of the function identifiers derived from the call stack does not match a possible path in the call graph, the supervisor function may perform a negative response; otherwise, the supervisor function may call the protected function.

Each caller function in a call chain may, but need not, be validated until the caller function is identified as the browser. The caller function identifier for a browser, and/or run-time environment, may be a base and/or constant value, such as zero, nil, null, and/or some other value. For purposes of illustrating a clear example, assume that callback function 150 in FIG. 2 is triggered by a legitimate browser in response to user input, and callback function 150 expressly calls the protected function (function 120). When callback function 150 attempts to call function 120, supervisor function 220 may intercept the call and trace the call stack. The first function in the call stack (the direct caller) is callback function 150. Supervisor function 220 may determine that callback function 150 is authorized to call the protected function. In response, supervisor function 220 may determine the second function in the call stack (an indirect caller, which in this example is the browser or run-time environment), and receive a base value, such as null, which indicates that no other functions are in the call stack, or that the browser is the initial caller function. If none of the functions in the call stack were determined to be unauthorized, then supervisor function 220 may call the protected function (function 120); otherwise, supervisor function 220 may perform a negative response.

3.2.3 Blacklisting Caller Functions

A supervisor function may include a blacklist of caller function identifiers. If the supervisor function determines that a direct or indirect caller function is associated with a function identifier that is on the blacklist, then the supervisor function may perform one or more negative responses. In an embodiment, if the supervisor function determines that no direct and/or indirect caller functions are on the blacklist, then the supervisor function may call the protected function.

4.0 EXAMPLE NETWORK TOPOLOGY FOR DYNAMICALLY PROTECTING FUNCTIONS EXECUTED ON A CLIENT COMPUTER

FIG. 3 illustrates a computer system comprising a browser, a web infrastructure, and an intermediary computer, which may be configured to protect functions and/or data structures defined, referenced, or called from instructions sent from the web infrastructure to the client computer, in an example embodiment. In FIG. 3, system 300 comprises web infrastructure 305, client computer 399, intermediary computer 330, storage 340, and configuration 335 distributed across one or more interconnected networks.

While each of the components listed above is illustrated as if running on a separate, remote computer from each other, one or more of the components listed above may be part of and/or executed on the same computer. For example, intermediary computer 330, configuration 335, storage 340, and/or web infrastructure 305 may be executed on the same computer, local area, and/or wide area network. Additionally or alternatively, intermediary computer 330 may be a proxy server and/or layer for web infrastructure 305. Additionally or alternatively, intermediary computer 330 may be in line between a router and web infrastructure 305, such that intermediary computer 330 may intercept all network data sent to, and/or sent from, web infrastructure 305 over one or more protocols. Additionally or alternatively, intermediary computer 330, and/or one or more modules and/or logic comprising intermediary computer 330 discussed herein, may be a software layer between, and/or executed on, web infrastructure 305 and/or a component of web infrastructure 305. Additionally or alternatively, intermediary computer 330, and/or one or more modules and/or logic comprising intermediary computer 330 discussed herein, may be part of a server-side application that responds to requests over one or more standard and/or proprietary protocols, such as Hypertext Transfer Protocol ("HTTP"), SPDY, and/or any other protocol.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

4.1 Web Infrastructure

Web infrastructure 305 may comprise one or more server computers that receive requests for data from users through one or more client computers, such as client computer 399 and/or intermediary computer 330. Web infrastructure 305 may respond by sending data to the browser that sent the request. The data sent from web infrastructure 305 may include one or more types of instructions, such as HTML, JavaScript, CSS, and/or any other standard or propriety instructions. The one or more computers in web infrastructure 305 may, but need not, be owned and/or managed by one or more independent entities and may span across one or more computer networks, such as the Internet.

A server computer may be a computer that receives requests for data and responds with data. For example, a web server computer may be an HTTP-based computer that receives HTTP requests and responds with data comprising HTML and/or JavaScript instructions. Additionally or alternatively, a server computer may respond with data that references data on other server computers in, and/or outside of, web infrastructure 305.

4.2 Intermediary Computer

Intermediary computer 330 may be an intermediary that may intercept instructions sent from web infrastructure 305, parse and/or execute one or more of the intercepted instructions, modify the intercepted instructions, generate and/or add new instructions, and send the modified and/or new instructions to a client computer. For example, intermediary computer 330 may intercept original web page 110, generate modified web page 210, and send modified web page 210 to browser 395. Intermediary computer 330 may intercept a request from browser 395, generate a new and/or modified request, and send the new and/or modified request to web infrastructure 305.

Intermediary computer 330 may be an HTTP or SPDY intermediary that intercepts, parses, executes, and/or processes HTML, JavaScript, and CSS instructions. Additionally or alternatively, intermediary computer 330 may intercept requests for data and/or instructions from a client application, generate a new HTTP request, and send the newly generated HTTP request to one or more HTTP and/or SPDY-based web servers. Additionally or alternatively, intermediary computer 330 may be an intermediary for any other standard and/or proprietary protocol. Furthermore, each of the components discussed herein, which intermediary computer 330 is comprised of, may be configured to perform any of the processes and/or methods discussed herein for any standard and/or proprietary protocol.

Intermediary computer 330 may be a server computer that one or more domain name servers or other elements of the domain name system ("DNS") identify in DNS records as a destination network address associated with one or more internet domain names. Accordingly, intermediary computer 330 and/or intermediary computer 330 may receive requests sent to the one or more domains from a browser or bot. Based on using DNS to resolve the domain name in a request to a network address, intermediary computer 330 may forward the request, or a modified request, to a server computer in web infrastructure 305, such as original web server computer 402. Intermediary computer 330 may be a router and/or a computer that is part of an internet service provider.

In FIG. 3, intermediary computer 330 is programmed to send instructions to, and receive requests from, a particular type of client application: browser 395. However, in an embodiment, intermediary computer 330 may be programmed to send instructions to, receive requests from, and/or open sockets with standard and/or proprietary client application on a client computer.

Figure 4:
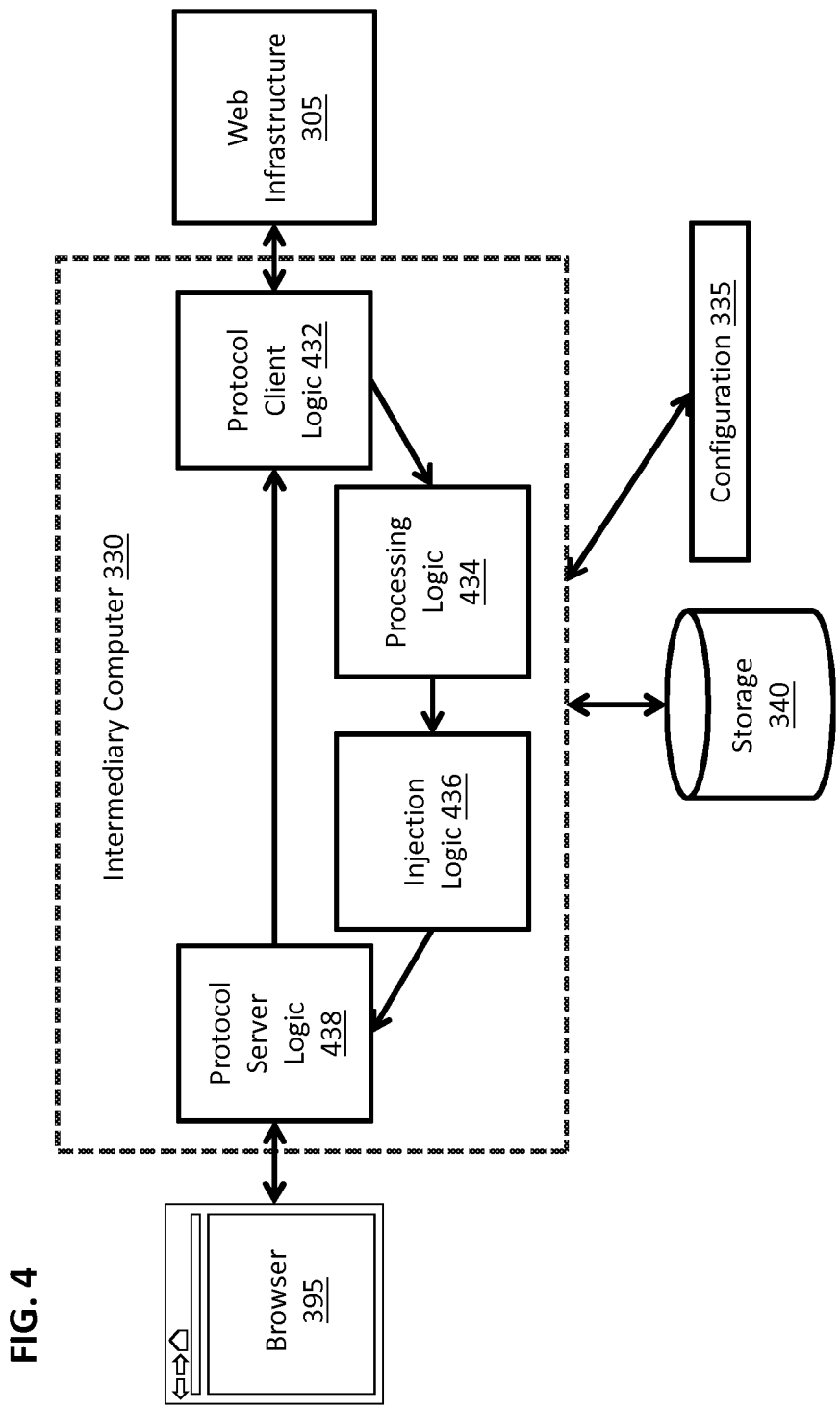
FIG. 4 illustrates a detailed view of an intermediary computer in an example embodiment.

FIG. 4 illustrates a detailed view of an intermediary computer in an example embodiment. In FIG. 4, intermediary computer 330 comprises protocol client logic 432, processing logic 434, injection logic 436, and protocol server logic 438. In an embodiment, each of the logical and/or functional units of intermediary computer 330 may be implemented using any of the techniques further described herein in connection with FIG. 7; for example, the intermediary computer 330 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other.

4.2.1 Protocol Client Logic

Protocol client logic 432 may intercept data over any standard or proprietary protocol. For example, protocol client logic 432 may intercept data over HTTP.

4.2.2 Processing Logic

Processing logic 434 may process instructions intercepted by protocol client logic 432, which causes processing logic 434 to generate one or more in-memory data structures that correspond to one or more objects. Processing one or more instructions may comprise parsing and/or executing the one or more instructions. After processing the instructions, processing logic 434 may notify injection logic 436 to begin rendering instructions based on the one or more data structures.

Processing logic 434 may make requests for additional data. For example, if instructions received from protocol client logic 432 reference one or more instruction files, then processing logic 434 may request the one or more instruction files through protocol client logic 432.

4.2.3 Injection Logic

Injection logic 436 may determine one or more functions that should be protected and which function(s) are authorized to call which of the one or more protected functions based on configuration 335, data structures in memory, and/or any other data, inputs, or factors. A supervisor function may protect a function defined by instructions received from web infrastructure 305 and/or a base function. A base function may be a function that is assumed or expected to be defined by instructions from a different source and/or the client-side run-time environment executing the instructions. For example, "getElementById" is an alias for a base function that is commonly defined by modern consumer browsers.

Injection logic 436 may determine which base functions are available on a client computer based on one or more factors. For example, a reference to a function that is not defined by the instructions received from web infrastructure 305 may be determined to be a base function. Additionally or alternatively, injection logic 436 may determine which base function(s) available based on the type and/or version of the recipient browser. The type and/or version of the recipient browser may be based on data received by browser 395 and/or web infrastructure 305.

Injection logic 436 may render a new set of instructions, which define one or more supervisor functions and/or one or more protected functions. Injection logic 436 may send the rendered instructions to one or more client computers through protocol server logic 438.

Injection logic 436 may further protect functions using one or more polymorphic protocols based on configuration 335, data structures in memory, and/or any other data, inputs, and/or factors. For example, injection logic 436 may assign a different alias to a protected function each time injection logic 436 renders a new set of instructions. Injection logic 436 may update and/or generate one or more supervisor functions to reference the protected function by the different alias.

4.2.4 Protocol Server Logic

Protocol server logic 438 may receive the instructions generated by injection logic 436 and send the generated instructions to client computer 399. Additionally or alternatively, protocol server logic 438 may intercept requests from client computer 399. Protocol server logic 438 may forward the request to web infrastructure 305 through protocol client logic 432 as the request would have been generated and sent by browser 395 had browser 395 received the original instructions without the supervisor functions from web infrastructure 305.

4.2.5 Configurations

Configuration 342 may be a database, a configuration file, and/or any other system that stores configurations: settings, preferences, and/or protocols. Configuration 342 may store more than one configuration for one or more web servers and/or web sites hosted in web infrastructure 305. For example, configuration 335 may include one or more supervisor protocols that indicate particular functions, in one or more particular web pages, for one or more particular web sites, hosted on web infrastructure 305 that should be protected. The particular functions may be defined by instructions received from web infrastructure 305 and/or base functions. Additionally or alternatively, configuration 335 may indicate that a particular web page need not be modified and/or one or more supervisor functions need not be added. Additionally or alternatively, configuration 335 may include data that indicates whether particular web pages should be processed by processing logic 434 and/or modified by injection logic 436.

Configuration 335 may be modified by a user and/or administrator through one or more computers, such as intermediary computer 330, a computer in web infrastructure 305, and/or another computer not illustrated in system 300.

4.2.6 Storage

Storage 340 may be a database, a configuration file, and/or any other system and/or data structure that stores data. In FIG. 3, storage 340 is illustrated as if a separate computer from intermediary computer 330. Additionally or alternatively, storage 340 may be a data structure stored in memory on the one or more computers comprising, at least in part, intermediary computer 330. Additionally or alternatively, storage 340 may, at least in part, be a data structure stored in shared memory between one or more intermediary computers. Additionally or alternatively, storage 340 may be, at least in part, non-volatile storage.

4.3 Browser

Browser 395 may be a browser as described herein and executed on a client computer, such as client computer 399. Additionally or alternatively, browser 395 may be a bot comprising one or more of the components traditionally found in a browser.

5.0 PROCESS OVERVIEW

In an embodiment, a data processing method may be configured to intercept instructions from a server computer that are directed toward a browser, generate one or more supervisor instructions, which define one or more supervisor functions, render a second set of instructions comprising the supervisor instructions. Various embodiments may use standard web protocols, such as HTTP, and/or standard web-based instructions, such as HTML and/or JavaScript. Additionally or alternatively, other standard and/or proprietary protocols may be used. Additionally or alternatively, other standard and/or proprietary instructions may be used.

5.1 Intercepting Instructions from a Server Computer

Figure 5:
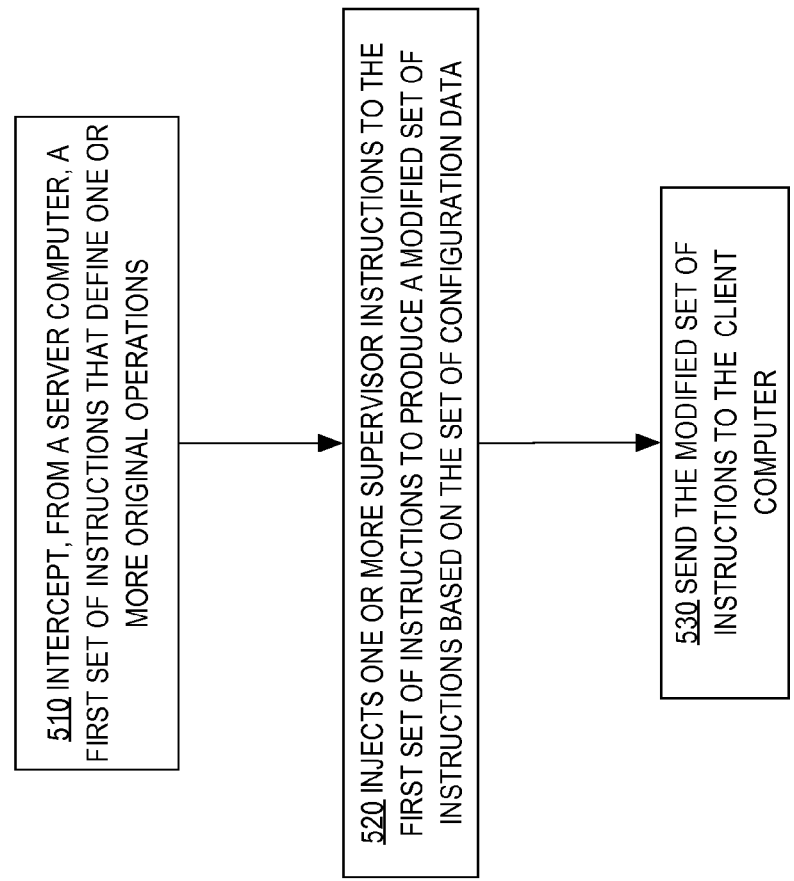
FIG. 5 illustrates a process for intercepting instructions from a server computer, determining whether one or more functions should be protected, generating one or more supervisor instructions configured to intercept and validate calls to one or more the protected functions, render a new set of instructions that define one or more supervisor function(s), and send the new set of instructions to a client computer, in an example embodiment.

FIG. 5 illustrates a process for intercepting instructions from a server computer, determining whether one or more functions should be protected, generating one or more supervisor instructions configured to intercept and validate calls to one or more the protected functions, render a new set of instructions that define one or more supervisor function(s), and send the new set of instructions to a client computer, in an example embodiment. In step 510, an intermediary computer intercepts, from a server computer, a first set of instructions that define one or more original operations. For purposes of illustrating a clear example, assume that browser 395 on client computer 399 requests original web page 110 from a server computer in web infrastructure 305. The request may be sent through intermediary computer 330. In response, protocol client logic 432 may receive original web page 110 from a web server computer in web infrastructure 305.

5.2 Injecting Supervisor Instructions into a Web Page

Figure 6:
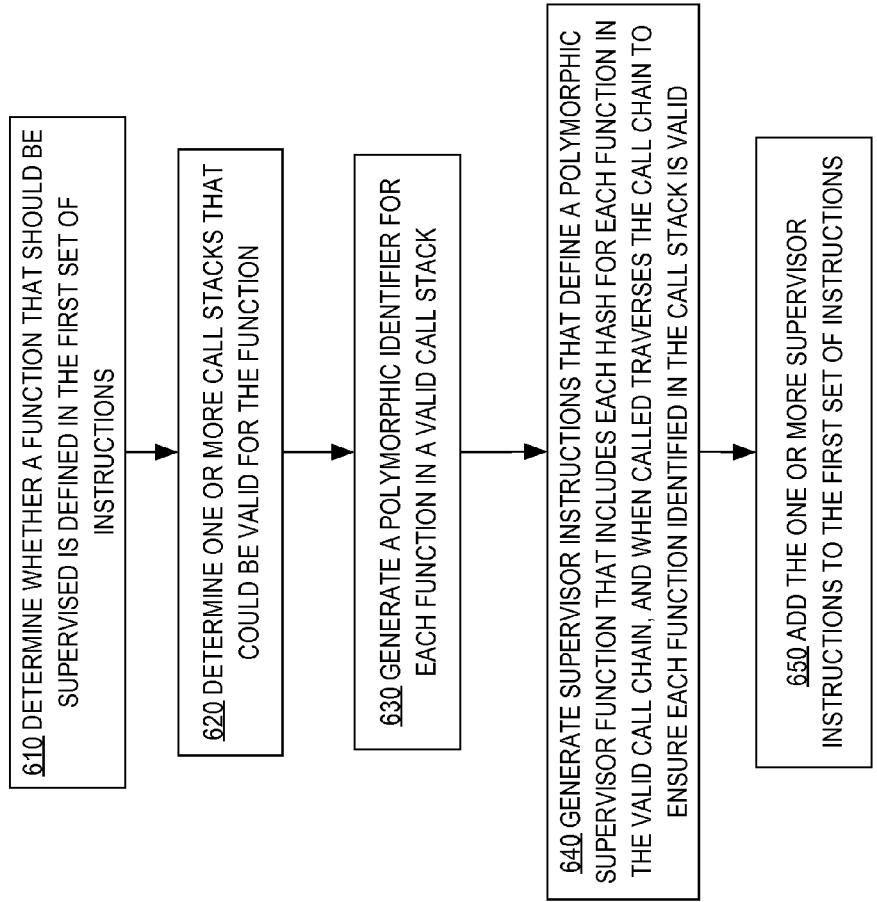
FIG. 6 illustrates a process for determining which function(s) in a web page should be protected, generating supervisor instructions that define one or more supervisor functions, and adding the supervisor instructions to the original set of instructions, in an example embodiment.

In step 520, the intermediary computer injects one or more supervisor instructions into the first set of instructions to produce a modified set of instructions based on the set of configurations data. FIG. 6 illustrates a process for determining which function(s) in a web page should be protected, generating supervisor instructions that define one or more supervisor functions, and adding the supervisor instructions to the original set of instructions, in an example embodiment.

5.2.1 Determining which Functions should be Protected

In step 610, the intermediary computer determines whether a function that should be protected is defined in the first set of instructions. For example, processing logic 434 may process the original web page 110 and determine one or more objects and/or functions that are defined in the original web page 110. Injection logic 436 may retrieve data from configuration 335 indicating which function(s), if any, should be protected in original web page 110. For purposes of illustrating a clear example, assume that data retrieved from configuration 335 indicates that function 120 defined in original web page 110 should be protected.

There are many ways or protocols by which configuration 335 may be updated to indicate which function(s) should be protected. For example, after original web page 110 is written, a user, such as a developer or web site administrator, may store data in configuration 335 indicating that one or more functions defined and/or referenced in original web page 110, or other base functions, should be protected. Also for example, a user may associate one or more functions with a security protocol, such as a countermeasure or anti-tamper function.

Injection logic 436 may automatically determine if a particular function is related to security and/or should be protected. For example, intermediary computer 330 may inject one or more functions that implement one or more countermeasures. Accordingly, injection logic 436 may determine that each of the one or more injected functions should be protected. Additionally or alternatively, if a function in a web page is configured to enforce, subvert, and/or disable one or more countermeasures, then injection logic 436 may determine that the function protected.

Injection logic 436 may select functions that reference one or more objects to be protected. For example, a user, computer, and/or logic may identify one or more objects and/or container objects that should be protected. Processing logic 434 may process original web page 110 and generate one or more in-memory data structures indicating which object(s) are referenced by which function(s). Injection logic 436 may determine that each function that references a protected object should be protected by a supervisor function.

5.2.2 Determining One or More Authorized Call Stacks

Returning to FIG. 6, in step 620, the intermediary computer determines one or more call stacks, and/or one or more call graphs, that could be valid for the protected function. For purposes of illustrating a clear example, assume that configuration 335 indicates that first caller function 130, second caller function 140, callback function 150 are authorized caller functions. Injection logic 436 may generate a call graph indicating that first caller function 130 and callback function 150 are both authorized to call function 120, and second caller function 140 is authorized to call first caller function 130. Additionally or alternatively, the call graph may indicate that second caller function 140 is an authorized indirect caller function for function 120. Additionally or alternatively, the generated call graph may indicating that second caller function 140 is only authorized to call function 120 indirectly through first caller function 130.

A user, such as a web site administrator and/or developer, may store data in configuration 335 indicating which caller functions are authorized to call a protected function. The user may store data in configuration 335 indicating which caller functions are authorized to be direct caller functions and which caller functions are authorized to be indirect caller functions. The user may store data in configuration 335 defining one or more call stacks and/or call graphs for one or more functions that should be protected. Injection logic 436 may generate one or more authorized call functions, call stacks, and/or call graphs.

Processing logic 434 may generate one or more in-memory data structures that indicate which function(s), if any, reference a protected function. For each protected function, injection logic 436 may determine that each caller function that references the protected function directly and/or indirectly is an authorized caller function accordingly. Injection logic 436 may generate a call graph accordingly. Additionally or alternatively, processing logic 434 and/or injection logic 436 may use one or more compiler techniques to determine one or more authorized call functions, call stacks, and/or call graphs.

Intermediary computer 330 may store and/or retrieve data defining one or more authorized set(s) of caller function(s), call stack(s) and/or call graph(s) in volatile and/or non-volatile memory. For example, injection logic 436 may store the call graph for function 120, which includes identifiers for first caller function 130, first function caller 140, and callback function 150, in storage 340. In response to receiving the original web page 110 and/or another web page with function 120, injection logic 436 may retrieve the call graph in storage 340. Injection logic 436 may, but need not, re-determine and/or update the authorized set(s) of caller function(s), call stack(s) and/or call graph(s) retrieved from storage 340.

5.2.3 Generating Authorized Caller Function Identifiers

In step 630, the intermediary computer generates an identifier for each function in a valid call stack. For example, injection logic 436 generates an authorized caller function identifier for each authorized caller function in the call graph generated and/or retrieved in step 620, which in this example is first caller function 130, second caller function 140, and callback function 150. For purposes of illustrating a clear example, assume the authorized caller function identifiers are "130", "140", and "150", respectively.

As discussed in detail herein, a supervisor function compares one or more authorized caller function identifiers to an identifier generated on-the-fly of an actual caller function to determine whether the actual caller function is authorized to call the protected function. (For convenience of expression, the one or more methods used by injection logic 436 to generate the authorized caller function identifiers is referred to herein as a "server-side hashing function"; the one or more methods used by a supervisor function to determine the actual caller function identifier may be referred to herein as the "client-side hashing function".) Accordingly, the client-side hashing function may be configured to produce the same identifier as the server-side hashing function for authorized caller functions.

The client-side hashing function included in, and/or referenced by, a supervisor function may perform the same or equivalent operations or steps as the server-side hashing function to compute the authorized caller function identifier(s). However, the server-side hashing function may perform different operations or steps than the client-side hashing function. For example, the server-side hashing function may generate a lookup table that maps one or more authorized caller function properties with an authorized caller function identifier. The client-side hashing function may use the lookup table to determine an actual caller function identifier. If the lookup table does not include an entry that maps to a valid actual caller function identifier, then the client-side hashing function may return an error and/or one or more caller function identifiers that do not match an authorized caller function identifier.

For purposes of illustrating a clear example, the server-side hashing function and the client-side hashing function are called functions herein. However, the server-side hashing function and/or client-side hashing function may be one or more instructions and/or data structures used to generate one or more caller function identifiers. Additionally or alternatively, injection logic 436 may use a different server-side hashing for to generate the authorized function identifiers for each supervisor function; accordingly, each supervisor function may use a different, corresponding client-side hashing function.

The authorized caller function identifiers may be polymorphic. If an attacker determines what the server-side hashing function and/or client-side hashing function is configured to do, then the attacker may change modify a malicious function to cause the client-side hashing function to return an authorized function identifier for the malicious function. Accordingly, the server-side hashing function and the client-side hashing function may synchronously change the operations used to determine caller function identifiers. For example, injection logic 436 may inject one or more instructions in modified web page 210, which when executed perform the one or more operations used by the server-side hashing function. When a new server-side hashing function is used, then injection logic 436 may inject new instructions in modified web page 210, which when executed are configured to produce the same identifier(s) as the new server-side hashing function for the authorized caller function(s).

5.2.4 Generating and Injecting Supervisor Instructions into a Web Page

In step 640, the intermediary computer 330 generates the supervisor instructions that define a polymorphic supervisor function that includes each hash for each function in the valid call stack, and when called traverses the call stack to ensure each function identifier in the call stack is valid. For example, injection logic 436 may generate the JavaScript instructions in Snippet 6. Injection logic 436 may also generate one or more instructions that define the client-side hashing function aliased in Snippet 6 as "identifierHash".

In step 650, the intermediary computer 330 adds the one or more supervisor instructions to the first set of instructions. For example, injection logic 436 may inject the JavaScript instructions in Snippet 6 and the client-side hashing function generated in step 640 into original web page 110, to produce modified web page 210.

5.3 Sending the Modified Web Page to the Client Computer

Returning now to FIG. 5, in step 530, the intermediary computer sends the modified set of instructions to the client computer. For example, injection logic 436 may send modified web page 210 to browser 395 through protocol server logic 438. Browser 395 may process and/or execute modified web page 210 as discussed herein. For purposes of illustrating a clear example, assume that Snippet 2, Snippet 7, Snippet 8, and Snippet 9 are excerpts of modified web page 210.

Snippet 7:

| line 1: | `<form id="Booth" action="vote.com/submitVote.php" method="post">` |
| line 2: | `<hidden id="ValidationToken" name="ValidationToken" value="false">` |
| line 3: | `<p>name: <input id="Candidate" name="Candidate"/></p>` |
| line 4: | `<input id = "Vote" name= "Vote" type="button" value="Vote" onclick="CallbackFunction150( );">` |
| line 5: | `</form>` |

Snippet 7 is similar Snippet 1; however, in line 4 of Snippet 7, a callback function, callback function 150, aliased as "CallbackFunction150", is registered with the browser, which may be called by the browser when a user selects the Vote button.

Snippet 8:

| line 1: | `var CallbackFunction150 = function( ) {` |
| line 2: | `var candidateName = document.getElementById("Candidate").value;` |
| line 3: | `if(candidateName != "") {` |
| line 4: | `Function120( );` |
| line 5: | `}` |
| line 6: | `else {` |
| line 7: | `alertUserOfInvalidCandidateSelection( );` |
| line 8: | `}` |
| line 9: | `}` |

Snippet 8 defines callback function 150. Callback function 150 may be configured to verify that the Candidate field defined in Snippet 7 is not empty. If the Candidate field is not empty, then control may proceed to line 4, which expressly calls the protected function, function 120; otherwise, control may proceed to line 7 that expressly calls a function that indicates a candidate's name has not be entered into the Candidate field.

Snippet 9:

| line 1: | `var ProtectedFunction120 = Function120;` |
| line 2: | `var SupervisorFunction220 = function( ) {` |
| line 3: | `var AuthorizedCallerIDs = [130, 140, 150];` |
| line 4: | `var Caller = arguments.callee.caller;` |
| line 5: | `while(Caller) {` |
| line 6: | `var CallerID = identifierHash(Caller);` |
| line 7: | `if(AuthorizedCallerIDs.doesNotHave(CallerID))` |
| line 8: | `{ return;` |
| line 9: | `}` |
| line 10: | `else if(Caller == Caller.caller) {` |
| line 11: | `break;` |
| line 12: | `}` |
| line 13: | `Caller = Caller.caller;` |
| line 14: | `}` |
| line 15: | `ProtectedFunction120( );` |
| line 16: | `}` |
| line 17: | `Function120 = SupervisorFunction220;` |

Snippet 9 comprises supervisor instructions that define supervisor function 220. Snippet 9 is similar to Snippet 3; however, in Snippet 9, supervisor function 220 defines a supervisor function that iteratively checks each function in the call stack to validate the call stack. For purposes of illustrating a clear example, assume the "doestNotHave" function, referenced in line 7, determines whether the value in the parameter (CallerID) is included in the set of authorized caller function identifiers. In line 10, if a function in the call stack is recursive, then the supervisor function will detect that the function is recursive and may avoid an endless loop by breaking out of the "while" loop (in line 11) and calling the protected function (in line 15). If the call stack is valid, the supervisor function 220 may expressly call the protected function, function 120, using the protected alias: "ProtectedFunction120".

For purposes of illustrating a clear example, assume browser 395 is a legitimate browser, a user enters "Brad" into the candidate field defined in Snippet 7, and the user selects the Vote button. In response, browser 395 executes callback function 150. Callback function 150 determines that the Candidate field is not blank, and calls the protected function with the protected function's original alias: Function120. Supervisor function 220, which is aliased as "Function120", intercepts the function call and validates the stack: Supervisor function 220 determines that a function identified as "150" attempted to expressly call the protected function, which is authorized; then supervisor function 220 determines that the browser, which is identified using a base value ("null"), called the callback function, which is authorized; and then supervisor function 220 may determine that there are no further functions identified in the call stack. Since each function in the call stack is authorized, supervisor function 220 may determine that the call stack is valid, and in response, call the protected function aliased as "ProtectedFunction120". Accordingly, a legitimate user may submit valid data and/or requests to the web server using the Booth form with a legitimate browser.

In the example above, the browser callback called a function that was defined by the web page (call back function 150). However, browser may call the protected function directly, using the protected function's original alias, which in this example is "Function120". The supervisor function may intercept the browser's call to the protected function, validate the call stack, and if valid, proceed to call the protected function.

For purposes of illustrating another clear example, assume browser 395 is a bot and/or infected browser that defines malicious function 190, as discussed above in Snippet 3, and calls malicious function 190 using the alias "MaliciousFunction190". In response, malicious function 190 may populate the Candidate field with "Ted" and proceed to call the protected function with the protected function's original alias: Function120. Supervisor function 220, which is aliased as "Function120", intercepts the function call and determines that the stack is invalid: Supervisor function 220 determines that a function identified as "190" attempted to expressly call the protected function, which is not authorized. In response, Supervisor function 220 proceeds to line 8 in Snippet 9 and performs a negative response: terminating quietly. Terminating quietly may be harder for an attacker to determine what functions prevented the protected function from being called. Accordingly, the supervisor function may prevent malicious code from being executed on a client computer, and/or malicious requests or data from being sent to a server computer.

6.0 IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
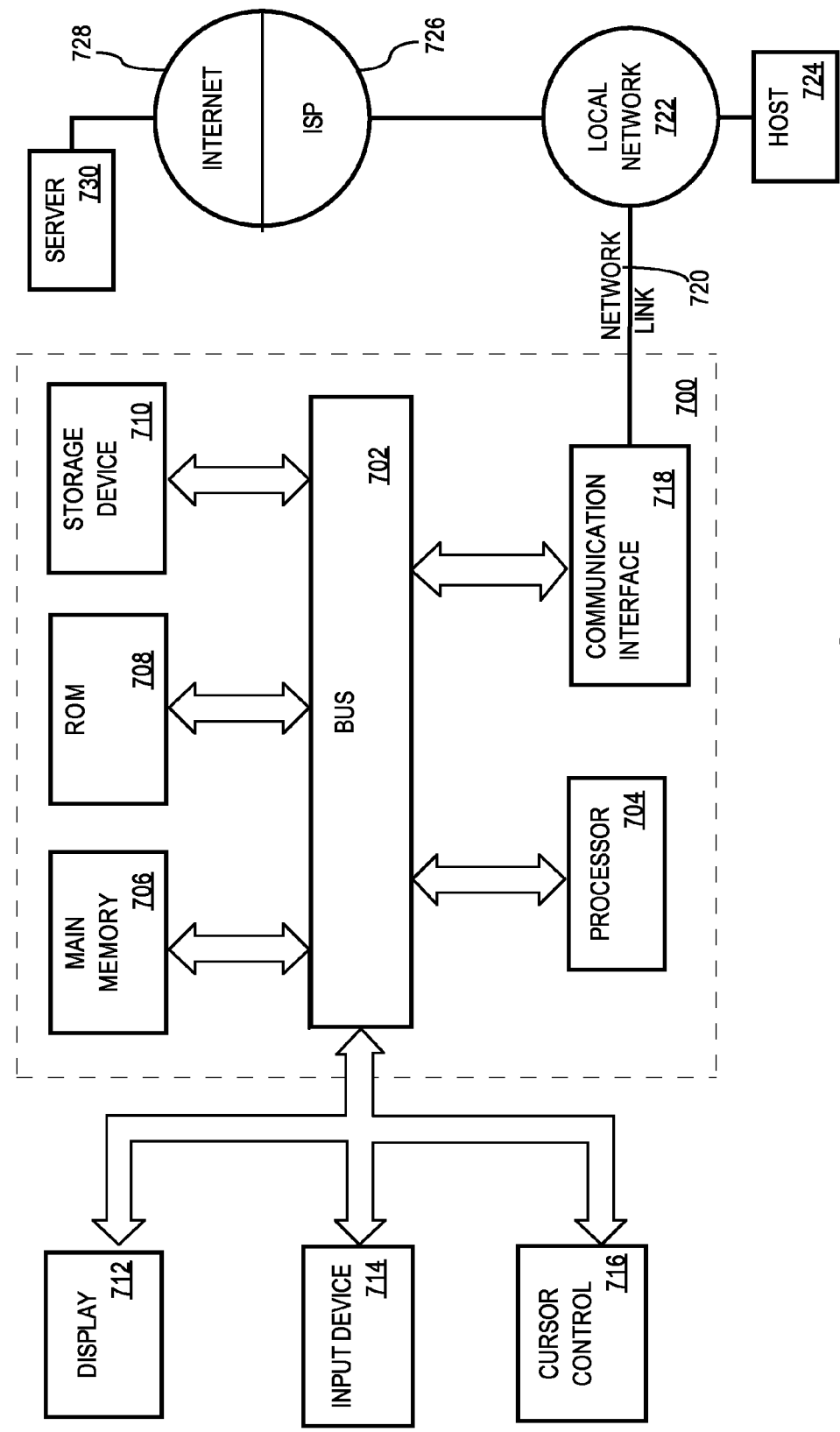
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 OTHER ASPECTS OF DISCLOSURE

Using the networked computer arrangements, intermediary computer, and/or processing methods described herein, security in client-server data processing may be significantly increased. The systems and methods discussed herein effectively reduce attacks from bot and other malicious code. Consequently, one or more various attacks, such as a denial of service ("DOS") attack, credential stuffing, fake account creation, ratings or results manipulation, man-in-the-browser attacks, reserving rival goods or services, scanning for vulnerabilities, and/or exploitation of vulnerabilities, are frustrated because supervisor instructions prevent bots and other malicious instructions from using one or more functions defined in a web page and/or a browser.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A specialized computing system comprising one or more processors, coupled to a remote client computer, and configured to send, to the remote client computer, one or more instructions, which when executed by the remote client computer, cause a run-time environment on the remote client computer to:
   intercept, within the run-time environment, a first call to execute a particular function defined in the run-time environment by a first caller function in the run-time environment;
   determine a first caller identifier, which corresponds to the first caller function identified in a run-time stack maintained by the run-time environment;
   wherein the one or more instructions include a first dynamic identifier and the one or more instructions are further configured to cause the run-time environment to, as part of determining the first caller identifier: determine a first caller name that corresponds to the first caller function from the run-time stack; and perform a hashing function on the first caller name to produce the first caller identifier;
   determine whether the first caller function is authorized to call the particular function based on whether the first caller identifier matches the first dynamic identifier.

2. The specialized computing system of claim 1, wherein the one or more instructions, which when executed by the remote client computer, are further configured to cause the run-time environment to terminate the first call without performing the particular function in response to determining that the first caller function is not authorized to call the particular function.

3. The specialized computing system of claim 1, wherein the one or more instructions, which when executed by the remote client computer, are further configured to cause the run-time environment to execute the particular function based, at least in part, on determining that the first caller function is authorized to call the particular function.

4. The specialized computing system of claim 1 wherein the one or more processors are further configured to:
determine the first caller name for the first caller function;
perform the hashing function on the first caller name to produce the first dynamic identifier;
insert the first dynamic identifier in the one or more instructions.

5. The specialized computing system of claim 1, wherein in response to determining that the first caller function is authorized to call the particular function, the one or more instructions, which when executed by the remote client computer, further causes the run-time environment to:
determine a second caller identifier, which corresponds to a second caller function identified in the run-time stack maintained by the run-time environment;
determine that the second caller function is not authorized to be in a stack of caller functions that call the particular function based on the second caller identifier, and in response, terminating the first call without performing the particular function.

6. The specialized computing system of claim 1, wherein the particular function is defined by the one or more instructions.

7. The specialized computing system of claim 1, wherein the particular function is defined by a run-time environment running on the remote client computer.

8. The specialized computing system of claim 1, wherein:
the first caller function is a function defined by the run-time environment;
determining whether the first caller function is authorized to call the particular function comprises determining whether the first caller identifier is assigned a generic identifier by the run-time environment.

9. The specialized computing system of claim 1, wherein the one or more instructions are one or more JavaScript instructions, and the run-time environment is a JavaScript run-time environment that is part of an HTTP-based browser configured to executing one or more HTML and JavaScript instructions.

10. A data processing system comprising:
a memory;
one or more processors coupled to the memory;
a protocol logic stored in the memory, executed by the one or more processors, and configured to cause the one or more processors to receive, from a web server computer, a first set of instructions that define one or more original operations;
an injection logic stored in the memory, executed by the one or more processors, and configured to cause the one or more processors to add one or more supervisor instructions to the first set of instructions to produce a modified set of instructions prior to providing the modified set of instructions to a client computer;
a server logic stored in the memory, executed by the one or more processors, and causing the one or more processors to send the modified set of instructions to a remote client computer;
wherein the one or more supervisor instructions are configured to cause a run-time environment executed on the client computer to intercept a first call to execute a particular function from a first caller function, determine whether the first caller function is authorized to call the particular function;
wherein the injection logic is further configured to cause the one or more processors to generate a first dynamic identifier based on a first original name assigned to a first original function and add the first dynamic identifier to the modified set of instructions;
wherein the one or more supervisor instructions are further configured to cause the run-time environment to generate a first caller identifier based on a first caller name associated with the first caller function, and determine whether the first caller function is authorized to call the particular function based on whether the first caller identifier matches the first dynamic identifier.

11. The data processing system of claim 10, wherein, upon determining the first caller function is not authorized to call the particular function, the one or more supervisor instructions are further configured to cause the run-time environment to terminate the first call without performing the particular function.

12. The data processing system of claim 10, wherein, based, at least in part, on determining the first caller function is authorized to call the particular function, the one or more supervisor instructions are further configured to cause the run-time environment to perform the particular function.

13. A data processing system comprising:
a memory;
one or more processors coupled to the memory;
a protocol logic stored in the memory, executed by the one or more processors, and configured to cause the one or more processors to receive, from a web server computer, a first set of instructions that define one or more original operations;
an injection logic stored in the memory, executed by the one or more processors, and configured to cause the one or more processors to add one or more supervisor instructions to the first set of instructions to produce a modified set of instructions prior to providing the modified set of instructions to a client computer;
a server logic stored in the memory, executed by the one or more processors, and causing the one or more processors to send the modified set of instructions to a remote client computer;
wherein the one or more supervisor instructions are configured to cause a run-time environment executed on the client computer to intercept a first call to execute a particular function from a first caller function, determine whether the first caller function is authorized to call the particular function;
wherein the injection logic is further configured to cause the one or more processors to generate a second dynamic identifier based on a second original name assigned to a second original function and add the second dynamic identifier to the modified set of instructions;
in response to the run-time environment determining that the first caller function is authorized to call the particular function, the one or more supervisor instructions are further configured to cause the run-time environment to:
determine a call stack that led the first caller function to be called;
determine a second caller function from the call stack;
determine a second caller identifier based on a name associated with the second caller function;
determine whether the second caller function is authorized to be in the call stack based on the second dynamic identifier and the second caller identifier;

terminate the first call without performing the particular function based on determining the second caller function is not authorized to be in the call stack.

14. A method comprising:

intercepting, within a run-time environment, a first call to execute a particular function defined in the run-time environment by a first caller function in the run-time environment;

determining a first caller identifier, which corresponds to the first caller function identified in a run-time stack maintained by the run-time environment;

determining whether the first caller function is authorized to call the particular function based on the first caller identifier;

receiving one or more instructions from a server computer, which includes a first dynamic identifier;

wherein the determining the first caller identifier comprises determining a first caller name that corresponds to the first caller function from the run-time stack, and performing a hashing function on the first caller name to produce the first caller identifier;

wherein the determining whether the first caller function is authorized to call the particular function is based on whether the first caller identifier matches the first dynamic identifier;

wherein the method is performed by one or more computing devices.

15. The method of claim 14 further comprising:

terminating the first call without performing the particular function in response to determining that the first caller function is not authorized to call the particular function.

16. The method of claim 14 further comprising executing the particular function based, at least in part, on determining that the first caller function is authorized to call the particular function.

17. The method of claim 14 further comprising, in response to determining that the first caller function is authorized to call the particular function:

determining a second caller identifier, which corresponds to a second caller function identified in the run-time stack maintained by the run-time environment;

determining that the second caller function is not authorized to be in a stack of caller functions that call the particular function based on the second caller identifier, and in response, terminating the first call without performing the particular function.

18. The method of claim 14, wherein the particular function is defined by one or more instructions received from a server computer.

19. The method of claim 14, wherein the particular function is defined by default by the run-time environment and not by one or more instructions received from a server computer.

20. The method of claim 19, wherein the particular function is referenced by the one or more instructions received from the server computer.

21. The method of claim 14, wherein:

the first caller function is a function defined by the run-time environment;

determining whether the first caller function is authorized to call the particular function comprises determining whether the first caller identifier is assigned a generic identifier by the run-time environment.

22. The method of claim 14 further comprising:

receiving one or more JavaScript instructions from a server computer;

executing the one or more JavaScript instructions;

wherein the run-time environment is configured, based at least in part on the one or more JavaScript instructions, to intercept the first call to execute the particular function, determine the first caller identifier, and determine whether the first caller function is authorized.

* * * * *